United States Patent [19]

Willenbrock et al.

[11] 3,895,647
[45] July 22, 1975

[54] VALVE
[75] Inventors: Helmut Willenbrock, Achim;
Friedrich Schittek, Bremen, both of Germany
[73] Assignee: Gustav F. Gerdts KG, Bremen, Germany
[22] Filed: Jan. 21, 1974
[21] Appl. No.: 435,379

[30] Foreign Application Priority Data
Jan. 23, 1973 Germany.......................... 2303053

[52] U.S. Cl................................. 137/529; 137/535
[51] Int. Cl.²................... F16K 15/00; F16K 17/04
[58] Field of Search.................... 137/535, 538, 529

[56] References Cited
UNITED STATES PATENTS
| | | | |
|---|---|---|---|
| 1,152,280 | 8/1915 | Boy.................................... | 137/529 |
| 1,529,440 | 3/1925 | Leinert............................ | 137/535 X |
| 2,063,047 | 12/1936 | Noble.............................. | 137/535 X |
| 2,655,935 | 10/1953 | Kinzbach......................... | 137/538 |
| 3,854,496 | 12/1974 | Broszeit.......................... | 137/535 X |

FOREIGN PATENTS OR APPLICATIONS
1,650,383  10/1970  Germany.............. 137/535

Primary Examiner—Alan Cohan
Assistant Examiner—Gerald A. Michalsky
Attorney, Agent, or Firm—Allison C. Collard

[57] ABSTRACT

A valve consisting of a housing having an input opening defining a valve seat and a valve plate disposed over the input opening on the valve seat. The valve plate includes a radial support shoulder and the housing is provided with a plurality of axial ribs on its inside periphery, each of the ribs having a radial groove. An abutment plate is disposed above the valve plate and engages the radial grooves formed in each of the axial ribs. A plurality of spring bars having one end clamped to the shoulder of the valve plate and the opposite end clamped to the abutment plate are axially tensioned and inclined with respect to the stroke movement of the valve plate so that the force components of the spring bars in the direction of the stroke movement decreases in total force with respect to the force of the spring acting on the closed valve plate.

11 Claims, 4 Drawing Figures

VALVE

This invention relates to a valve controlled by the pressure of a medium flow. When the valve of the present invention opens, the decreasing locking spring force, prevents a partial opening of the locking portion so that there is a complete opening of the valve. These types of valves are used as non-return valves, safety or excess pressure valves.

In a known embodiment of such a valve in German Pat. No. 190,542, a screw spring and a lever mechanism (several levers) are used in order to provide the desired decrease of the locking spring force. Furthermore, longitudinal central guide means are provided to assist in stabilizing the locking portion against tilting. The lever mechanism together with the screw spring and the abutment are substantially higher than the stroke path for the locking portion so that the valve housing must have a corresponding height. Therefore, this type of construction is not suitable for these valves, and is also expensive to manufacture.

It is therefore an object of the present invention to provide a valve of the aforementioned type wherein a lever mechanism between the spring element and the locking portion is eliminated, and wherein no central guide means to stabilize the locking portion is required. Therefore it is possible to make a short and simple valve. In the invention, the inclination of the spring bars with respect to the stroke direction changes independently of the stroke. Thereby the locking force exerted by the spring onto the locking portion decreases during the opening stroke, although the spring undergoes a further axial compression and curves to the sides. The reduction of pressure is also enhanced by the degressive curve line of the spring bars. The function of the formerly employed screw spring and lever mechanism is now replaced by the simple and smaller spring bars suggested in the subject invention.

An excellent tilting stabilization of the stroke body is obtained by spring bars whereby the longitudinal axis of the spring bars cross between the ends of the bars. It is also advantageous to provide clamping location so as to obtain the required safety against turning of the locking member. Also often guiding means (than clamping locations) could be provided to avoid turning of the locking member.

It is also possible to decrease the required size of the valve since the required length of the spring bars with respect to the moving path (stroke movement) is relatively short. An additional cushioning effect is also obtained in the opening stroke of the locking portion of the region of the upper stroke to eliminate a hard engagement (impact) of the locking portion onto the stroke stop.

A simple clamping mechanism is also provided for the spring bars so that they are maintained in the same fixed position and ensures the requisite pivotable mobility of the bars. Furthermore, this clamping mechanism stabilizes the locking portion against tilting. There is also a fast and exact positioning of the spring bars during the assembly of the valve.

Other objects and features of the present invention will become apparent from the following detailed description considered in connection with the accompanying drawings which disclose several embodiments of the present invention. It should be understood, however, that the drawings are designed for the purpose of illustration only and not as a definition of the limits and scope of the invention to which reference should be made to the appended claims.

In the drawings wherein similar reference numerals denote similar elements throughout the several views.

Figure 1:
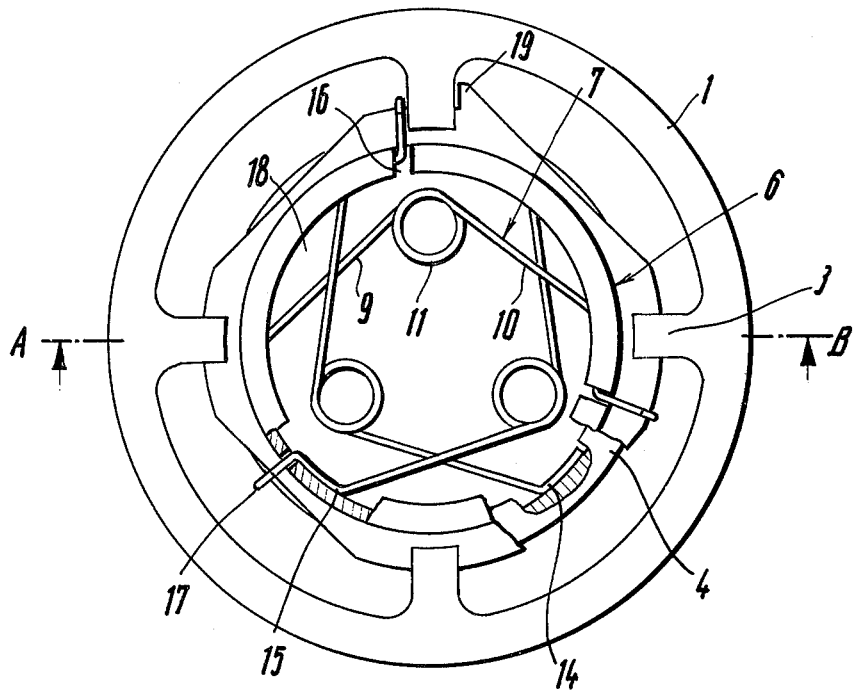
FIG. 1 is a plan view of a non-return valve.
Figure 2:
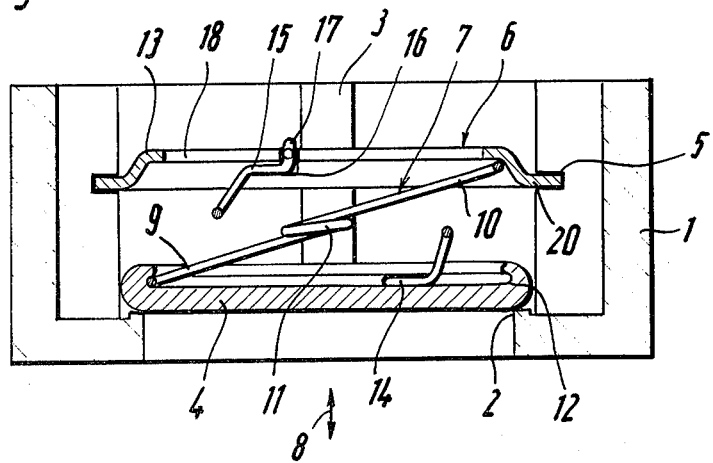
FIG. 2 is a cross-sectional view taken along section A-B of FIG. 1.

Referring to FIGS. 1 and 2, a short valve housing 1 is shown having a valve seat 2, and housing ribs 3. A locking portion or diaphragm is provideed in the housing and cooperates with valve seat 2. The valve seat and the locking portion are axially aligned. At the upper portion of locking portion 4, housing 1 carries an abutment 6 which is held in grooves 5 of ribs 3. Three even (equal) spring bars 7 are clamped in this axis (that means the ideal or imaginary straight connecting line between the two ends of each bar pointing (or resting) onto the support shoulders 12 and 13) between abutment 6 and locking portion 4 in an inclined position in direction of the stroke movement 8. Each spring bar 7 comprises two shanks 9 and 10 and one or more coil bindings 11 at the apex of the shanks for joining the shanks together. The spring bars are also pretensioned to have a radial buckle.

An axial as well as a radial support shoulder 12 and 13 are provided on locking portion 4, and on the abutment 6 for clamping the spring bars 7. The ends of shanks 9 and 10 are bent parallel to support shoulders 12 and 13 at fastening arms 14 and 15. The abutment is provided with three radial slots 16 which are radially offset with respect to each other by about 120°. Spring bars 7 together with their associated bent portion 17 engage slots 16. Furthermore, bent portion 17 simplifies the assembly and disassembly of spring bars 7. A large central opening 18 is provided is abutment 6 to permit removal of the spring bars. An extension 19 of abutment 6 in cooperation with the bent portion 17 of one spring bar and housing ribs 3 hold the abutment securely in place. It should also be mentioned that abutment 6 also serves as the stroke stop 20 for locking portion 4.

Since spring bars 7 are inclined with respect to stroke movement 8, only a partial spring force is effectively applied in the locking direction and onto locking portion 4, while the remainder of the spring force engages the locking portion radially. These radial forces thus neutralize each other, due to the offset angular arrangement of spring bars 7. With this arrangement, locking portion 4 is stabilized against tilting.

When locking portion 4 is lifted from valve seat 2, spring bars 7 pivot around shoulders 12 and 13, thus changing the degree of inclination of spring bars 7 in the direction of stroke movement 8, until the degree of the angle is almost in a right angle with respect to the upper end position of the locking portion. During this pivot movement, spring bars 7 are subjected to an axial compression, so that the diameter of each spring winding 11 decreases, and the bend of shanks 9 and 10 are increased, so that the total spring force is increased. At this point, the exerted spring force in the closing direction of the valve plate or locking portion 4 decreases due to the aforementioned change in the angle of the spring bars as the valve begins to open because during pivoting of the spring bars the force components in the direction of the stroke movement 8 decreases in its ratio to the total spring force in a relatively greater degree than the total spring force increases. This decrease of the spring force is still further enhanced by the degressive spring characteristics of spring bars 7. When locking portion 4 is lifted by the fluid medium from valve seat 2 and against the closing force of spring bars 7, the spring force at the locking portion is decreased below locking force and the valve opens suddenly until locking portion 4 assumes a completely open position and engages stroke stop 20.

Figure 3:
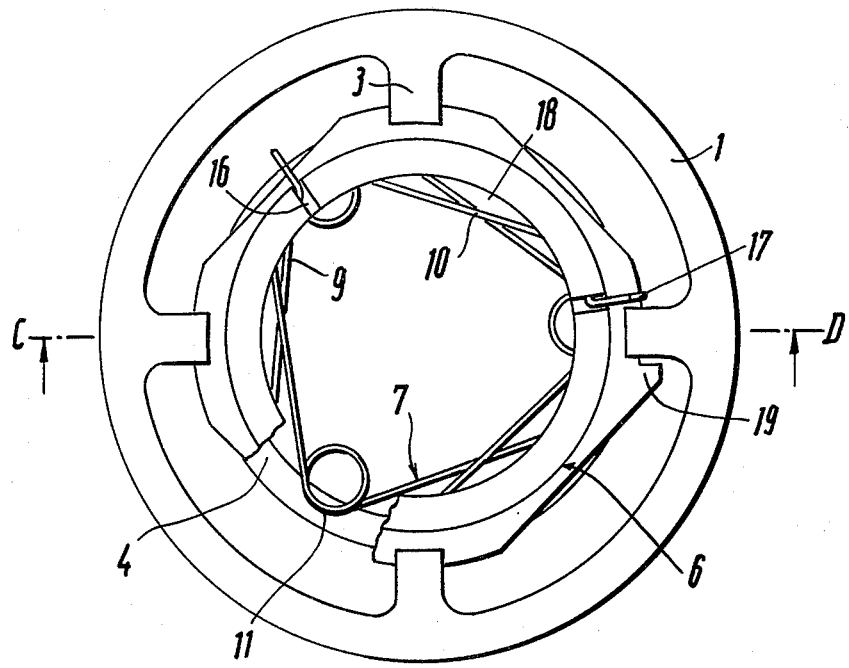
FIG. 3 is a plan view of another non-return valve.
Figure 4:
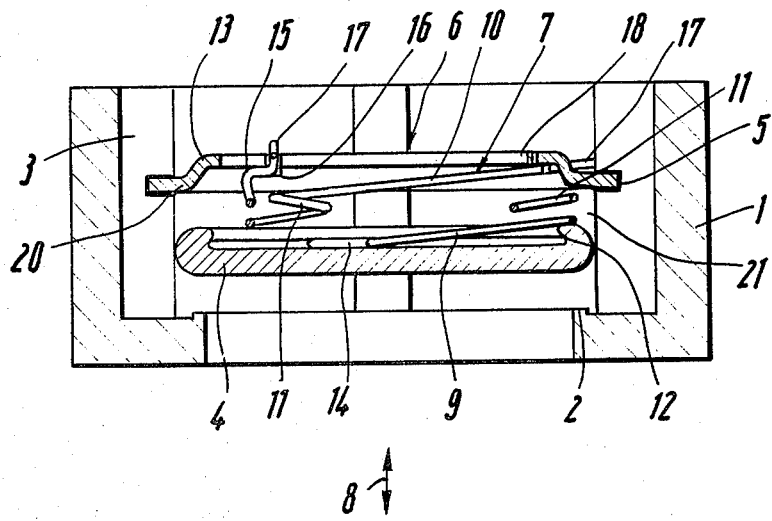
FIG. 4 is a cross-sectional view taken along section C-D of FIG. 3.

The embodiment of FIGS. 3 and 4 differs from the aforementioned embodiment in that windings 11 of each spring bar 7 are arranged parallel and in axial separation 21 with respect to each other. The windings are thus positioned between locking portion 4 and stroke stop 20.

During the last portion of the locking portion stroke movement as shown in FIG. 4, windings 11 of spring bars 7 act as cushioning spiral springs so as to cushion the stroke movement during the final stage.

While only a few embodiments of the present invention have been shown and described, it will be obvious to those skilled in the art that many changes and modifications may be made thereunto without departing from the spirit and scope of the invention.

What is claimed is:

1. A valve controlled by the fluid pressure of medium passing through comprising:
   a housing having an input opening defining a valve seat;
   a locking member movably disposed over the opening of the housing and positioned on the valve seat;
   an abutment member disposed in said housing substantially parallel to and axially spaced from said locking member;
   a plurality of springs in the form of substantially V-shaped bars having shanks, each spring having one end pivotably clamped to said abutment member, and its other end pivotably clamped to said locking member at a position substantially 180° with respect to said one end, said shanks of each of said springs defining a plane in which said each of said springs extends substantially laterally across the complete width of said members, said springs being spaced apart from the axis of said valve, said springs being axially tensioned, so that when fluid pressure reaches a predetermined level the locking member axially lifts off said valve seat in a direction towards said abutment member, causing said springs to approach a parallel orientation with respect to said members, thereby reducing the axial vector force component of the springs in the direction of the stroke movement, causing a positive snap-open valve action.

2. The valve according to claim 1 wherein each of said springs includes at least one coil winding at the intersection of said two shanks joining said shanks together.

3. The valve according to claim 2 wherein said at least one coil winding of each of said spring bars is substantially parallel to the axis of the stroke movement of said locking member.

4. The valve according to claim 3 wherein said coil windings of each of said springs is axially spaced apart from each other.

5. The valve according to claim 4 wherein said coil windings of said springs are arranged between said locking member and a stroke stop formed on said abutment member adjacent said housing.

6. The valve according to claim 2 wherein said locking members and said abutment member each comprises a support shoulder and the ends of the shanks of said springs are bent to form fastening arms extending parallel to said support shoulder of said locking member and said abutment member, and said fastening arms abutting upon said support shoulders.

7. The valve according to claim 6 wherein the free end of one of said fastening arms of each of said springs includes a bent hook portion, and said abutment member includes spaced apart radial slots for receiving said bent hook portions.

8. The valve according to claim 1 wherein said housing comprises an inside wall having a plurality of axial ribs, each of said ribs having a radial groove retaining said abutment member.

9. The valve according to claim 1 wherein said abutment member is annular and includes a central opening.

10. A valve controlled by the pressure of medium passing through comprising:
    a housing having an input opening defining a valve seat and having an inside wall formed with a plurality of axial ribs, each of said ribs having a radial groove;
    a locking member disposed over the opening of the housing and positioned on the valve seat;
    an abutment disposed in said housing and retained by said radial grooves;
    a plurality of spring bars each angularly arranged in said housing and each having one end pivotably clamped to said abutment and having its other end pivotably clamped to said locking member, said spring bars being axially tensioned and each defining a plane inclined with respect to the said locking member, and said abutment;
    at least one of said spring bars including means defining a bent hook portion adapted for engagement with one side of said ribs to maintain said abutment against turning, whereby when pressure of the medium reaches a predetermined level the locking member axially lifts off said valve seat in a direction towards said abutment causing said spring bars to approach a parallel orientation with respect to said locking member and said abutment and reducing the axial vector force component of the spring bars in the direction of the stroke movement causing a positive snap-open valve action.

11. The valve according to claim 10 wherein said abutment member additionally comprises a radial extension disposed on one side of one of said housing ribs so that said bent hook portion of said spring bar is disposed on the other side of said housing rib.

* * * * *